(12) United States Patent
Zinjuvadia et al.

(10) Patent No.: US 8,520,508 B2
(45) Date of Patent: Aug. 27, 2013

(54) SPANNING TREE RING PROTOCOL

(75) Inventors: Vishal Zinjuvadia, San Jose, CA (US);
Vikas Khetan, Sunnyvale, CA (US);
Girish Sarveiya, Pleasanton, CA (US)

(73) Assignee: Force10 Networks, Inc., San Jose, CA (US)

( * ) Notice: Subject to any disclaimer, the term of this patent is extended or adjusted under 35 U.S.C. 154(b) by 367 days.

(21) Appl. No.: 12/773,085

(22) Filed: May 4, 2010

(65) Prior Publication Data

US 2010/0226260 A1    Sep. 9, 2010

Related U.S. Application Data

(63) Continuation of application No. 11/824,567, filed on Jun. 29, 2007, now abandoned.

(60) Provisional application No. 60/889,705, filed on Feb. 13, 2007.

(51) Int. Cl.
*H04L 12/26* (2006.01)

(52) U.S. Cl.
USPC ............ 370/222; 370/217; 370/242; 370/248

(58) Field of Classification Search
USPC .................. 370/223, 255, 256, 258, 216, 217, 370/222, 242, 248
See application file for complete search history.

(56) References Cited

U.S. PATENT DOCUMENTS

| | | | | |
|---|---|---|---|---|
| 7,564,779 B2* | 7/2009 | Rose et al. | | 370/223 |
| 2003/0165119 A1* | 9/2003 | Hsu et al. | | 370/258 |
| 2006/0245351 A1* | 11/2006 | Pande et al. | | 370/216 |
| 2007/0047471 A1* | 3/2007 | Florit et al. | | 370/256 |
| 2007/0047472 A1* | 3/2007 | Florit et al. | | 370/256 |
| 2008/0123562 A1* | 5/2008 | Florit et al. | | 370/258 |

* cited by examiner

*Primary Examiner* — Hassan Kizou
*Assistant Examiner* — Toan Nguyen
(74) *Attorney, Agent, or Firm* — Haynes and Boone, LLP

(57) ABSTRACT

A plurality of network devices such as routers are included in an instance of a spanning tree. The network device creates a ring context on a port that it identifies as both a blocking port and configured to run a spanning tree protocol. The ring context can be comprised of a region name, an STP domain name or a spanning tree instance. The network device transmits a ring discover message for the ring context over a forwarding port and determines that a ring exists when it receives the message at a blocking port. The network device subsequently transmits a reverse ring discover message from its blocking port which includes the status of the discovered ring to the members of the ring topology.

13 Claims, 16 Drawing Sheets

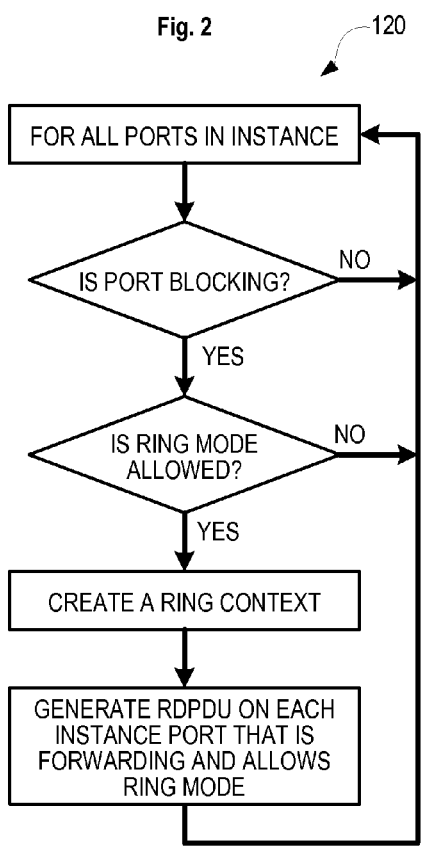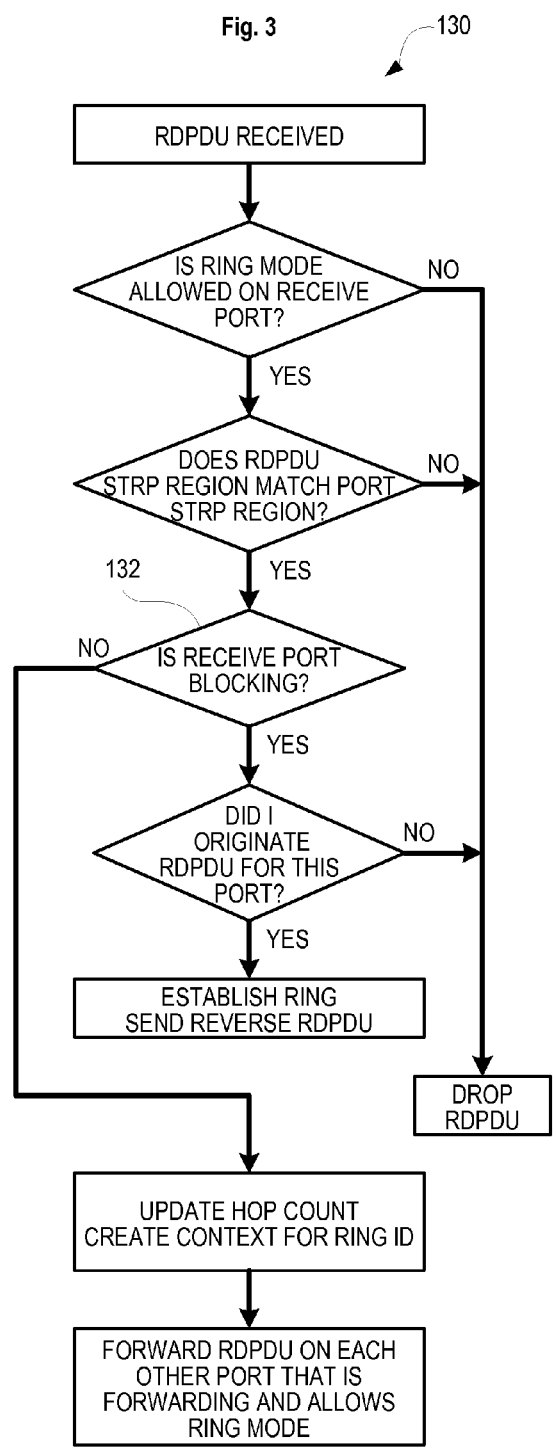
Fig. 2
Fig. 3

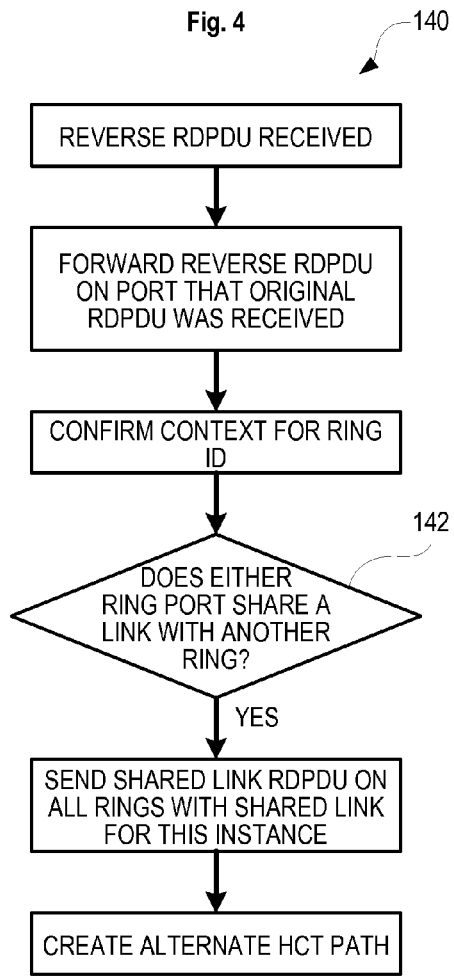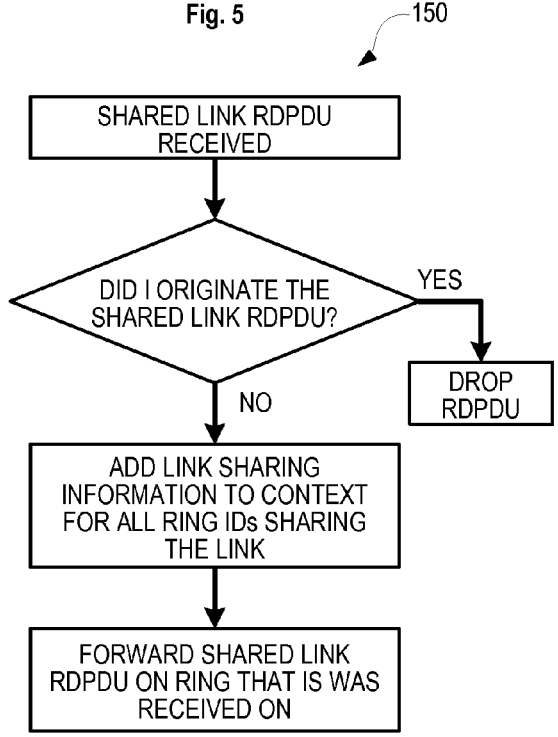

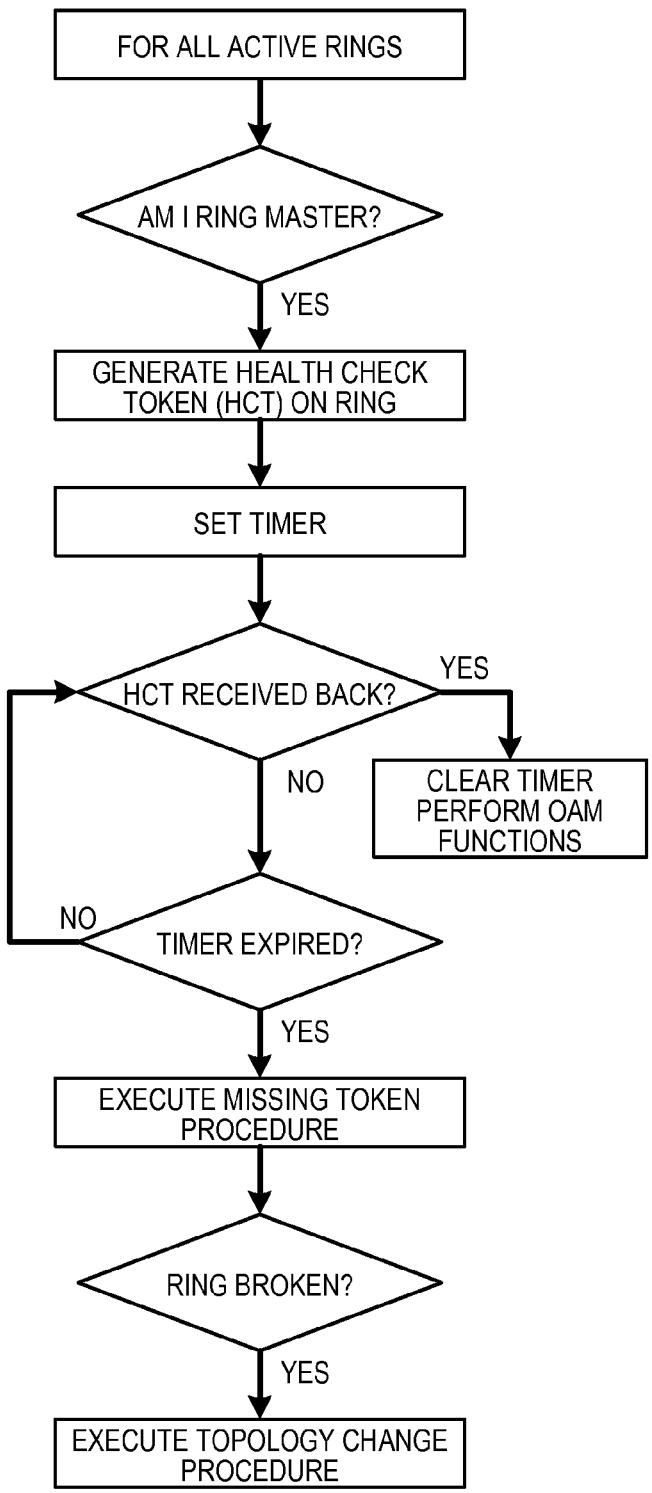

SPANNING TREE RING PROTOCOL

CROSS REFERENCE TO RELATED APPLICATIONS

This application is a continuation of and claims priority to U.S. patent application Ser. No. 11/824,567, filed Jun. 29, 2007 now abandoned, which claims the benefit of U.S. Provisional Application No. 60/889,705 filed on Feb. 13, 2007, which are incorporated herein by reference in their entirety.

FIELD OF THE INVENTION

The present disclosure relates generally to packet network topology configuration and redundancy mechanisms, and more particularly to systems and methods for operating a ring protocol in a network.

BACKGROUND

Spanning Tree Protocols (STPs) are used in computer networks to maintain a reconfigurable on-failure loop-free network topology within a group of interconnected switches having redundant paths. In the original STP specification (IEEE 802.ID, published by the Institute of Electrical and Electronic Engineers), failover and failback of links to employ alternate paths was timer-based.

Enhancements to the core spanning tree protocol were suggested, allowing rapid convergence and recovery of the spanning tree after link failure, independent of any timer. These enhancements became known as the Rapid Spanning Tree Protocol (RSTP), described in the IEEE 802.1 w specification, currently merged into the IEEE 802.1D-2004 standard.

Further enhancements to the basic spanning tree protocol were made to allow a group of switches to run multiple spanning trees instances within the same spanning tree domain. In such an enhanced protocol, an administrator provisions each switch in the spanning tree domain with a mapping between spanning tree instances and VLANs (Virtual Local Area Networks), and tailors the bridge parameters in each switch so that different multiple spanning tree instances will converge to different least cost paths through the network. The traffic for each VLAN is forwarded along the network paths for the spanning tree instance mapped to that VLAN. With some effort, an administrator can therefore achieve better load balancing than is generally possible with a single spanning tree instance, since no operational port will necessarily be blocked in all spanning tree instances. These enhancements are described in the IEEE 802.1s standard as the "Multiple Spanning Tree Protocol" (MSTP). Currently, MSTP has been integrated into the IEEE 802.1Q-2003 standard.

Additional enhancements in the field of spanning tree design are described in U.S. patent application Ser. No. 11/065,724, entitled "Packet Attribute-Mapped Spanning Tree Protocol," filed Feb. 24, 2005, and incorporated herein by reference. The Attribute-Mapped Spanning Tree Protocol (AMSTP) can be configured to map packet attributes other than (or in addition to) VLAN identifier to logical spanning tree instances. For instance, different spanning trees can be associated with different Ethernet layer 2 header Ethertypes, layer 3 addresses or portions of addresses, layer 4 types indicated by layer 3, IP options, multicast/unicast traffic, higher-layer header attributes, data attributes for specific packet types, etc. This structure provides powerful flexibility for dividing network resources according to a wide variety of specific traffic attributes.

All of these topology management solutions can be considered as spanning tree protocols and will be referred to herein as "STP" wherever the particular distinctions between these protocols are not pertinent to the discussion.

In laboratory tests, the time necessary for MSTP to converge to a new topology upon failure ranges from milliseconds to seconds, depending on the location of the failure in the network. Such a large variation in convergence time presents a challenge to network designers evaluating network failure scenarios and designing a network that meets connectivity guarantees for time-sensitive applications (Voice over Internet Protocol (VoIP), Digital Video-on-Demand, etc.) A spanning tree protocol that provides extremely fast and consistent failover performance could provide significant advantages over RSTP-like failover mechanisms.

Another type of topology management protocol that has been used in some specialized network topologies is a ring protocol. Ring protocols can be defined on a set of network nodes that are linked in a loop, such as the transport nodes in a large Metropolitan Area Network (MAN). Typically, a ring protocol is provisioned and enabled on the ring nodes manually, and one port on one node is designated as blocking to prevent network traffic from looping on the ring. The ring nodes circulate a control plane Protocol Data Unit (PDU) that contains a health check token. The PDUs can circulate on the ring as fast as the sum of the times it takes the nodes to receive, consume, process, and resend the PDUs for a given token, generally on the order of milliseconds for a ring. Should a health check PDU go missing, a timer expires on the node having the designated blocking port, and all nodes in the ring are instructed to flush and relearn their forwarding tables. Thus failure detection and recovery time is generally fast and predictable, with little dependence on the point of ring failure.

Current ring protocols are not without disadvantages. Such protocols enforce topological restrictions that limit applicability to only certain network configurations. Many such protocols are vendor-specific, and thus can only operate when all nodes in a ring were supplied by the vendor. The IEEE has now promulgated the IEEE 802.17 standard for "Resilient Packet Rings" (RPR) in fiber ring topologies. The RPR provides a MAC layer protocol specifically for Metro ring networks. The protocol makes some assumptions regarding the ring-like topology that are not consistent or compatible with the generic Ethernet MAC layer. Thus RPR, like the other ring protocols, requires topological constraints and lacks interoperability with currently deployed infrastructures.

BRIEF DESCRIPTION OF THE DRAWINGS

Aspects of the present disclosure are best understood from the following detailed description when read with the accompanying figures.

FIG. 2 contains a flowchart for a process by which a node can determine that is should initiate discovery of a ring passing through the node;

FIG. 3 contains a flowchart for a process by which a node processes ring discovery protocol data units (RDPDUs);

FIG. 4 contains a flowchart for a process by which a node processes reverse RDPDUs;

FIG. 5 contains a flowchart for a process by which a node processes shared link RDPDUs;

FIG. 6 contains a flowchart for a process used by a ring master to detect and respond to ring failures;

DETAILED DESCRIPTION

Figure 1:
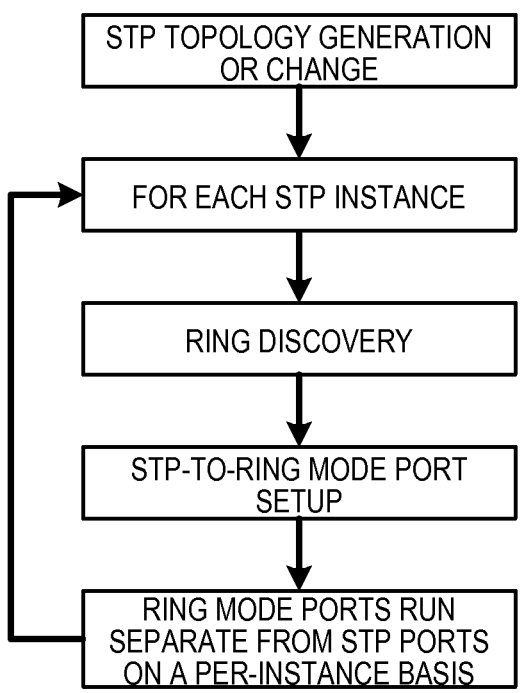
FIG. 1 contains a high-level flowchart for operating some or all of the switches in an STP domain according to a spanning tree ring protocol (STRP)

The following disclosure provides various embodiments for a new ring protocol. In some embodiments, this ring protocol operates within an arbitrary spanning tree domain. The ring protocol provides automatic discovery and configuration of rings within the spanning tree domain without modifying the initial spanning tree topology, while using the spanning tree topology to aid in ring discovery. Thus an STP domain can be set up with some (or all) links operating within a ring after initial convergence, providing advantages of both STP (topology initialization) and ring node operation (fast failover) in the same network segment. Even very complex topologies can be converted to have ring-like failover response, without the necessity of manual configuration of certain links into a ring and certain links as available to STP.

A significant advantage of some embodiments is that due to an attribute of interoperability with STP, nodes that are incapable of operating the ring protocol can still participate in the same layer 2 domain. For nodes that cannot process the ring protocol PDUs or are prevented from doing so, those nodes can remain in an STP mode and continue to see the entire domain as an STP domain. Links to the STP-only nodes continue to operate with RSTP-like convergence. In some cases, link failures on a ring can be handled without alerting non-ring nodes of the topology change.

Also due to interoperability with STP, some embodiments of the ring protocol can provide per-STP-instance ring topologies that match with MSTP/AMSTP spanning tree instances. Ring PDUs can also contain a message digest that can be used to detect configuration errors and or provide authentication to prevent ring-protocol-based network attacks. A default ring topology can also be configured, like a default MSTP instance, to handle traffic that is not mapped to a particular instance.

Some embodiments of the new ring protocol also greatly expand the universe of networks that can be provisioned with rings. In some such embodiments, arbitrary Ethernet-based networks using copper, fiber, wireless, and various mixes of these transmission media can run in a common ring-based solution.

In some embodiments, this ring protocol provides separate mechanisms for ring protocol PDUs and health check tokens (HCTs). The PDUs are designed for communication on the control plane between the nodes operating the ring protocol, and can be used for ring discovery, inter-ring status communications, and topology change messages. The HCTs are designed for communication on the data plane around their respective rings. Placing the HCTs on the data plane relieves many of the ring members from the task of processing the HCTs in software during steady-state operation, and allows for even faster and more predictable health check ring transit times.

In some embodiments, ring failover topology changes at each ring node provide intelligent flushing of forwarding entries. Forwarding addresses that pertain to a ring can be classified according to a link abstraction. The egress port for forwarding entries using a given ring can thus be switched from one ring port to the other upon failover without moving MAC addresses within the forwarding CAM (content-addressable memory). This reduces MAC address relearning and traffic flooding upon ring failover.

In some embodiments, the ring protocol can also provide operations, administration, &management (OA&M) functions that aid in network engineering. For instance, the ring protocol can provide latency estimates for each ring and for node-to-node transit times based on trip times for the health check tokens. The ring protocol itself can use round-trip latency estimates to adjust its thresholds dynamically for health check transit times. This allows the ring protocol to respond rapidly to link failures when traffic is light without mistakenly declaring a ring failure when traffic is overloaded and the health check tokens become inadvertently delayed.

In some embodiments, the ring protocol can provide a dynamic procedure for determining a master node and a standby node for each ring, and for switching the standby node to master upon failure of the master node.

Because the ring protocol can operate on arbitrary networks, novel loop-prevention methodologies are a significant component of the protocol. Various methods for determining that multiple rings share a link, and selecting a single ring to respond to a failure of the shared link, are disclosed.

Figure 9:
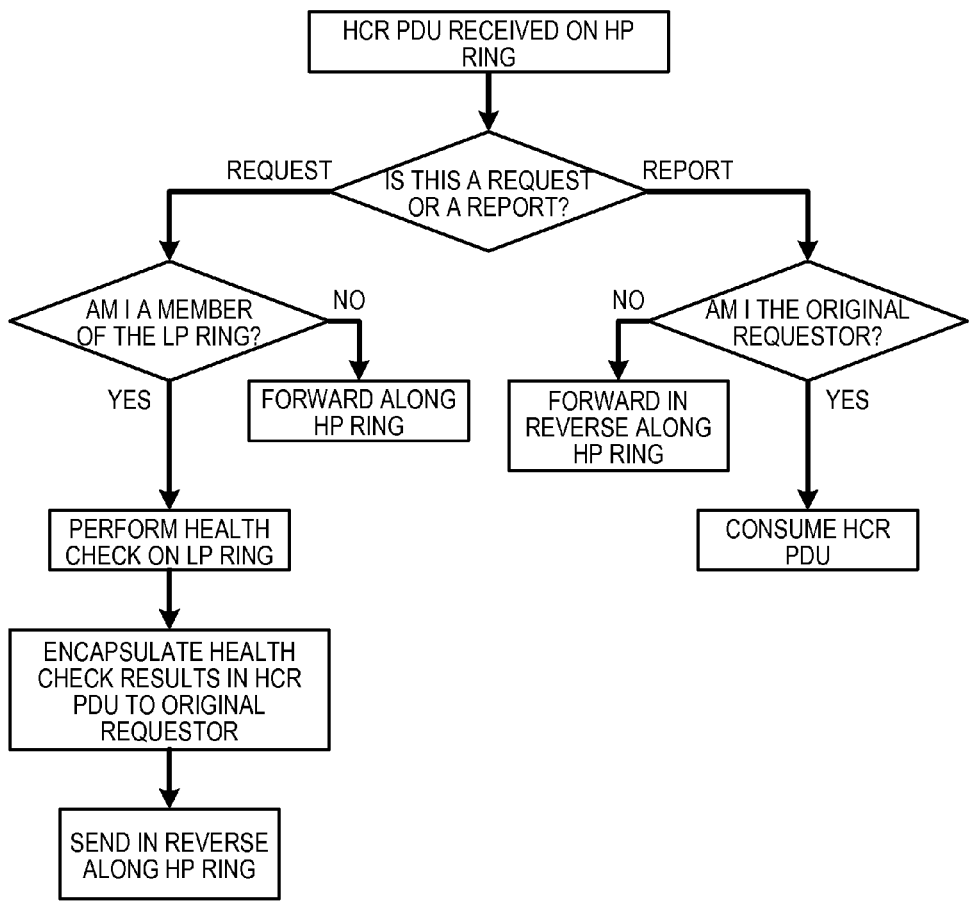
FIG. 9 contains a flowchart for a process used by a ring member node to process Health Check Request (HCR) PDUs propagated on a ring.
Figure 10:
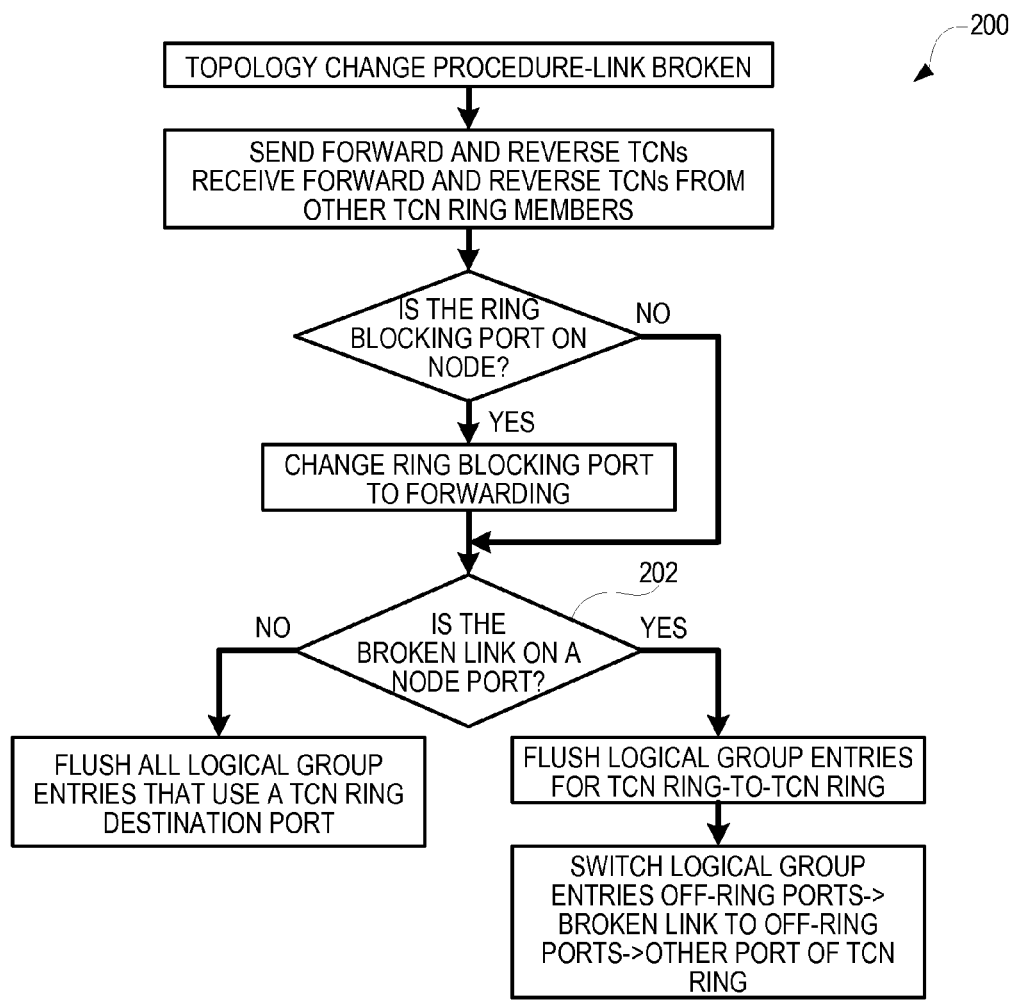
FIG. 10 contains a flowchart for a process used by a ring node to respond to Topology Change Notifications (TCNs) received on a ring.
Figure 11A:
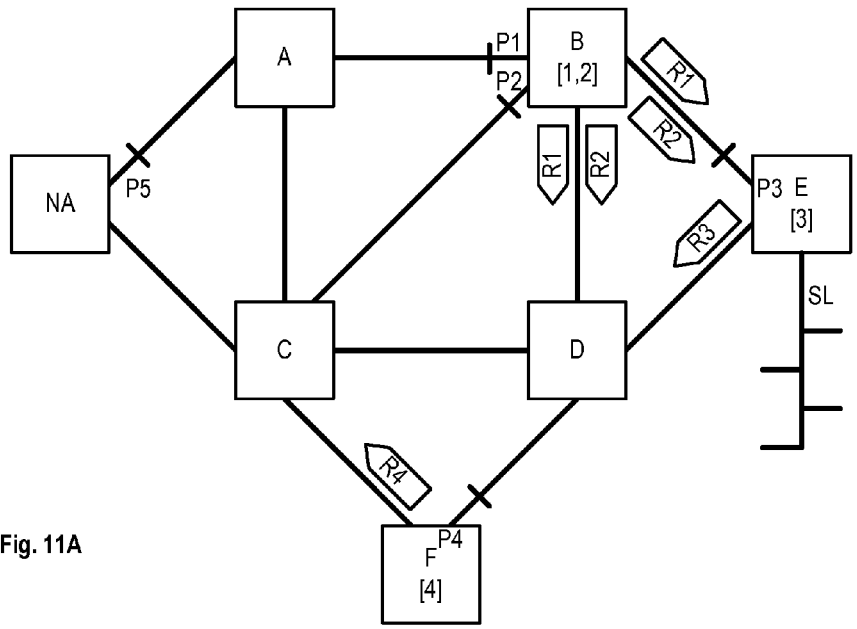
FIGS. 11A-11N illustrate an STP domain with multiple nodes and links operable in an STP ring mode—the figures step through examples of dynamic STP ring configuration and ring topology changes as a result of multiple link failures and link restorations.
Figure 11B:
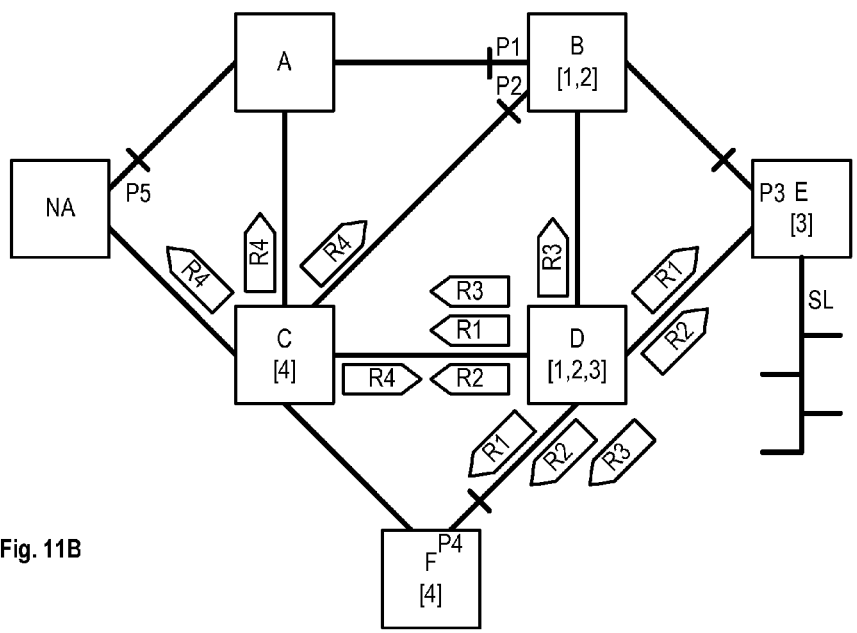
Figure 11C:
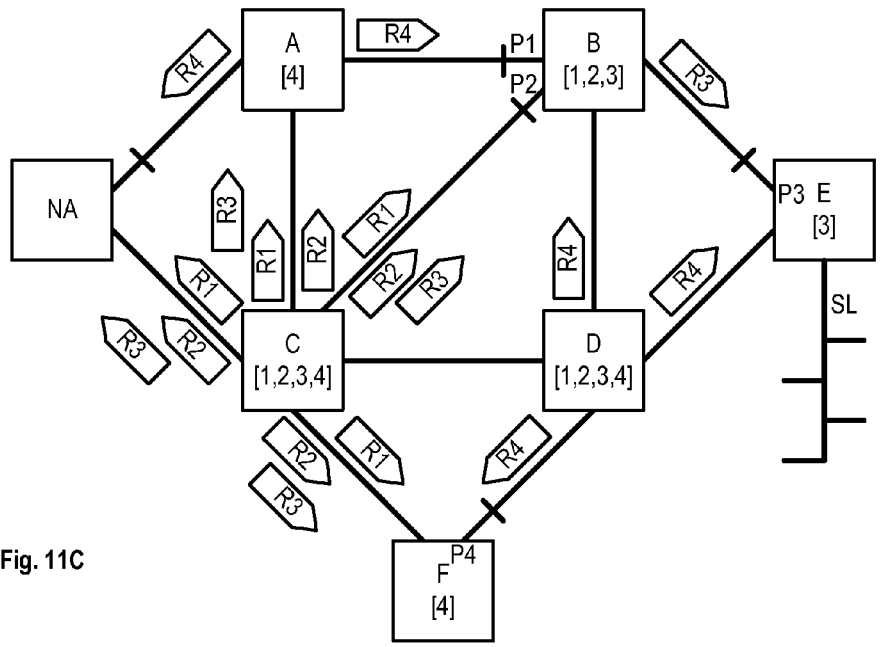
Figure 11D:
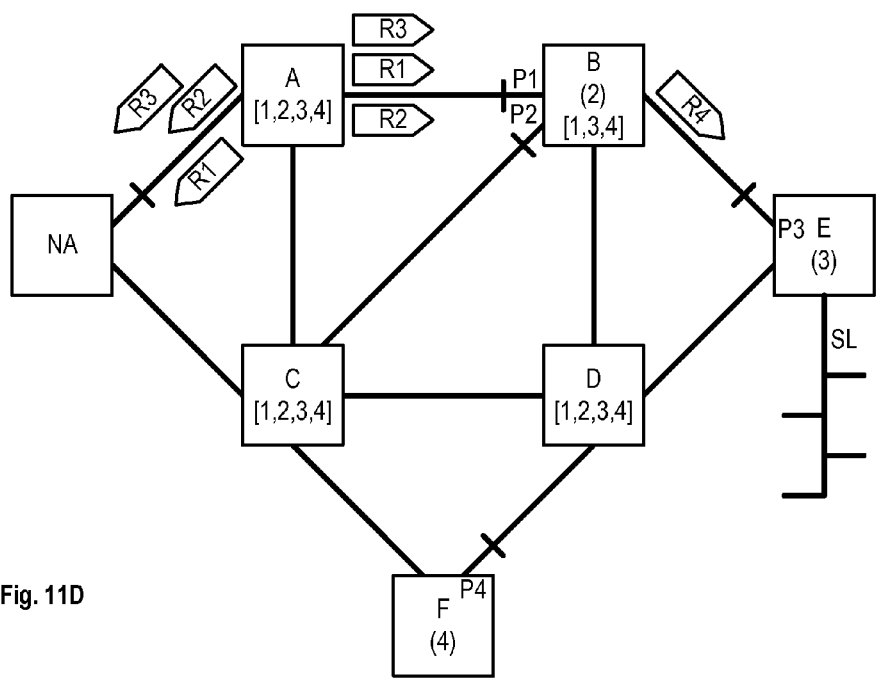
Figure 11E:
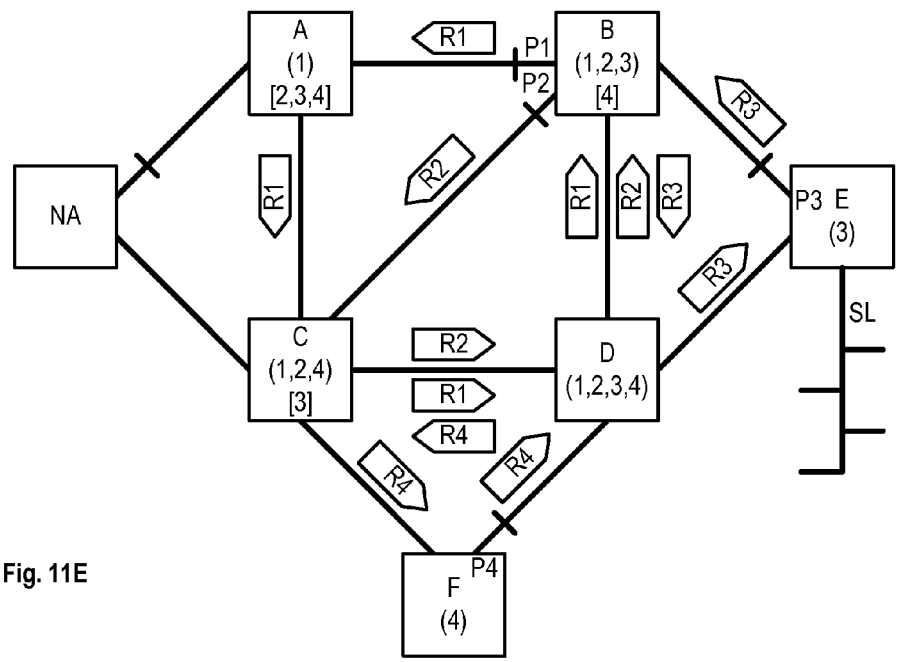
Figure 11F:
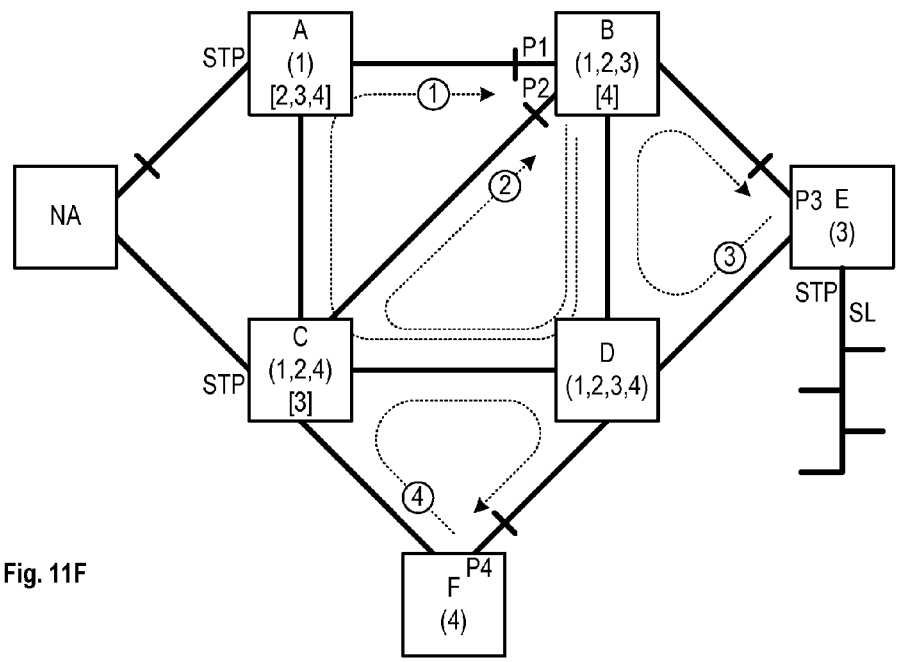
Figure 11G:
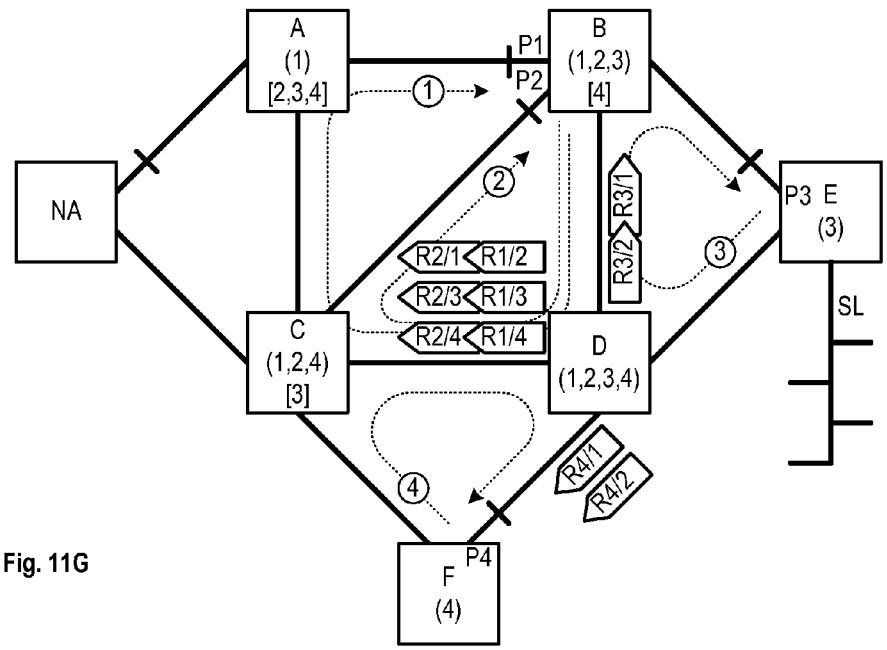
Figure 11H:
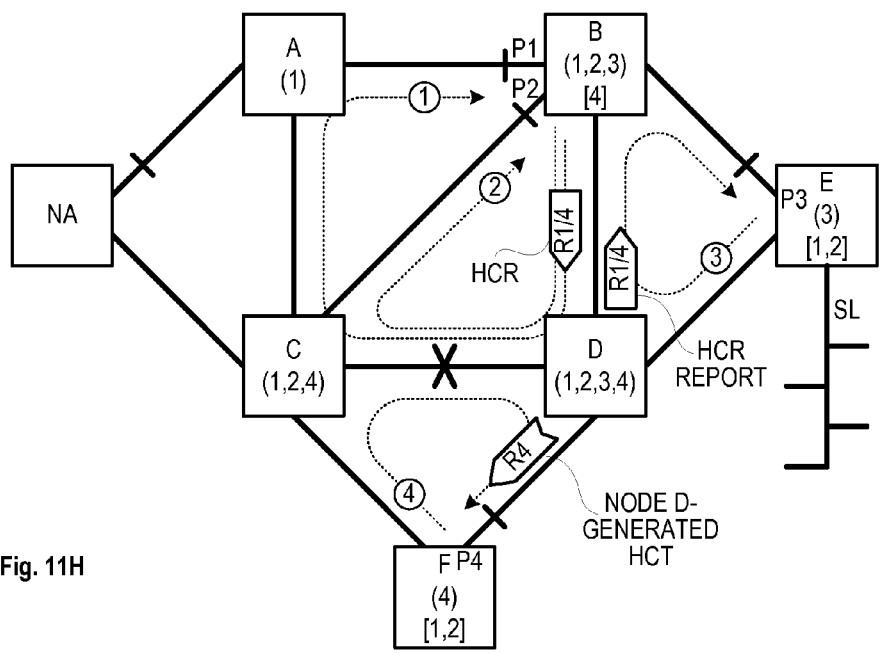
Figure 11I:
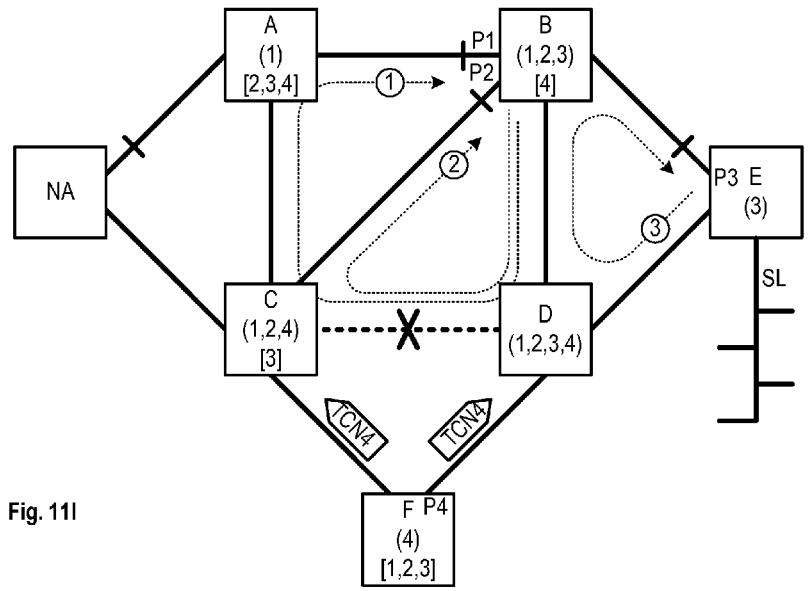
Figure 11J:
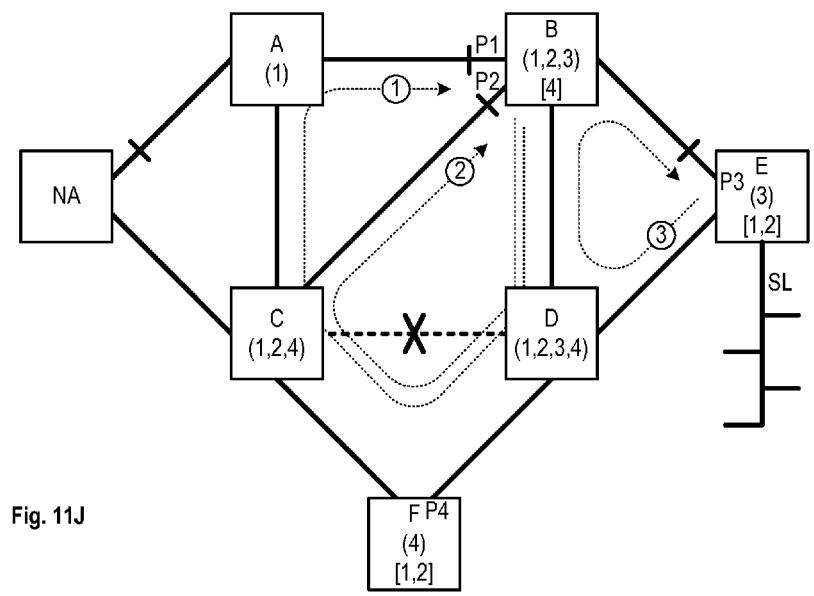
Figure 11K:
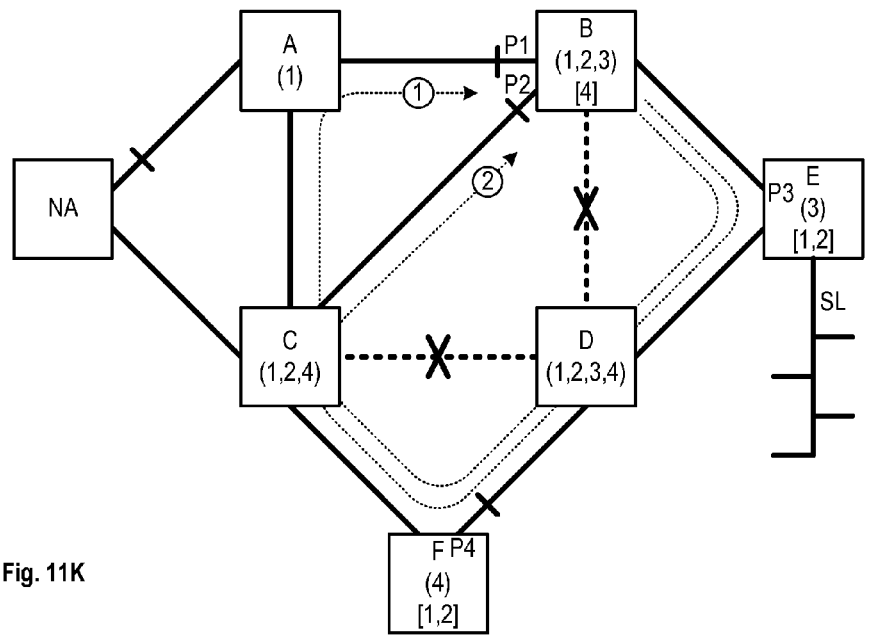
Figure 11L:
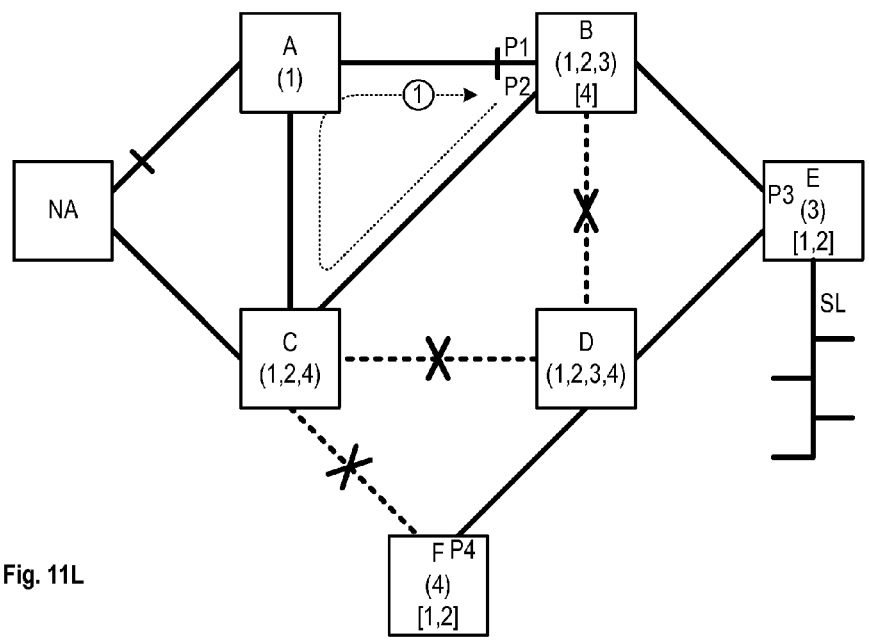
Figure 11M:
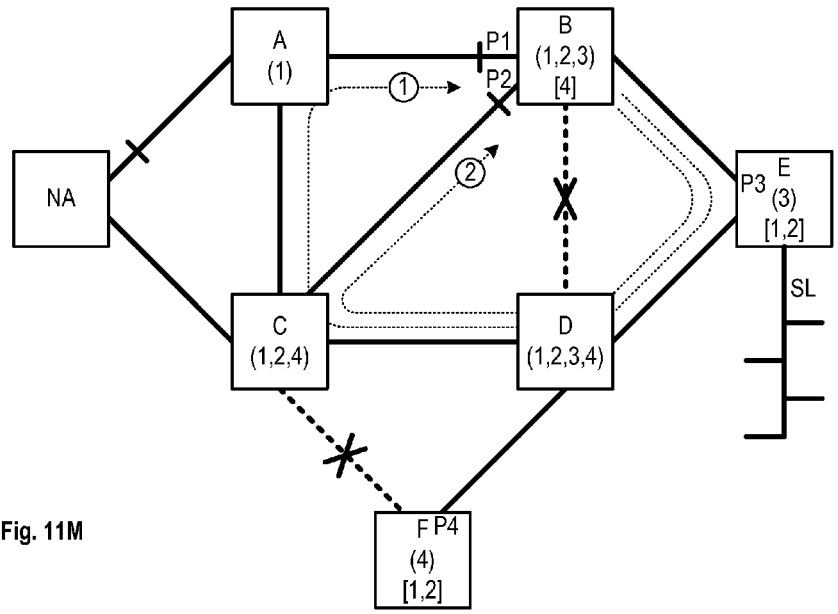
Figure 11N:
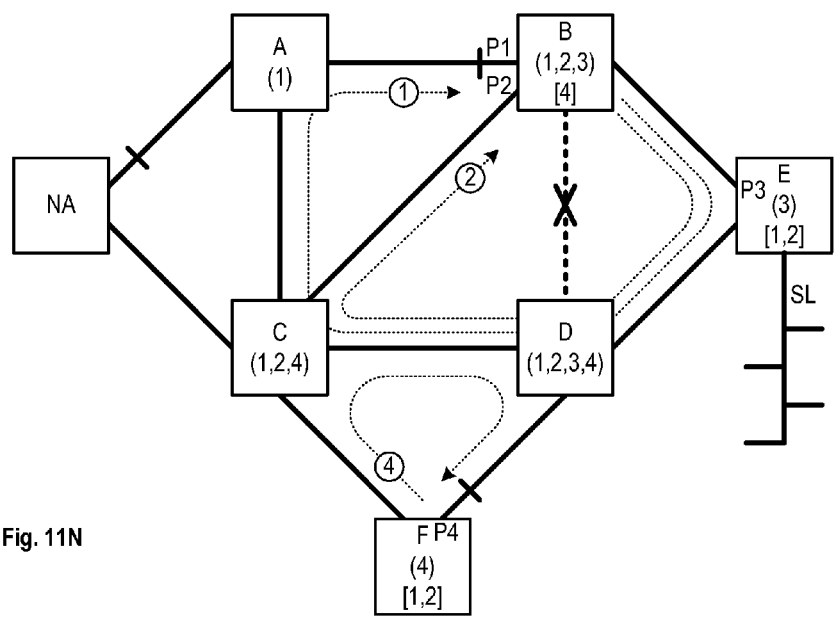

The following discussion presents various features of the embodiments with reference to the flowcharts of FIGS. 1-10 in conjunction with the network diagrams of FIGS. 11A-11N. In many cases, a flowchart will describe ring node actions and one or more of the network diagrams will illustrate the actions from an exemplary network perspective.

FIG. 1 IA shows an STP domain just after convergence of the spanning tree. The STP domain could be an STP or RSTP domain, a spanning tree instance in an MSTP or AMSTP domain, or a group of spanning tree instances that share a common topology. This domain comprises seven nodes A, B, C, D, E, F, and NA. The nodes are connected as shown by point-to-point Ethernet-based links, where each link could be an optical fiber link, a copper link, a wireless link, or a logical aggregation of several physical links. A shared link SL also connects to node E, and allows contention-based access between node E and a plurality of other network-connected devices (not shown). The STP domain will typically connect to other domains and nodes as well—these have been omitted in the figures for clarity.

During STP convergence, one of the nodes in the domain is elected as the STP root bridge, and the bridges select root ports and designated ports to provide connectivity to the root bridge. The remaining ports become blocking ports, which do not forward traffic. In FIG. 11 A, ports P1 and P2 011 node B, port P3 011 node E, port P4 on node F, and port P5 011 node NA are blocking. A blocking port is indicated by a bar drawn through the link near the port with a blocking port state.

In an exemplary embodiment, nodes A-F are provisioned with a Spanning Tree Ring Protocol (STRP) and node NA is provisioned with a spanning tree protocol. STRP functions like the spanning tree protocol with respect to spanning tree protocol exchanges with the node NA. FIG. 1 shows an exemplary high-level flowchart 110 of the additional protocol functions that the STRP nodes run between each other. After the STP topology is generated (or changed due to an STP reconvergence), each STRP node proceeds to the remaining steps of flowchart 110. Assuming that the spanning tree protocol contains multiple instances, STRP loops through each instance and performs ring discovery and STP-to-ring mode port setup. The ring mode ports then run separate from the STP ports 011 a per-instance basis. Note that an STRP node need not have all ports participating in the ring protocol— some ports can be manually excluded from becoming ring mode ports. For those nodes and ports that do run the STRP protocol, the ring functions shown in flowchart 110 will now be described in detail.

When STP converges to a stable topology, each blocking port is so designated to prevent a loop in the topology. It has now been recognized that these "loops" avoided by STP can be exploited by STRP to dynamically discover rings. Thus ring discovery uses STP port states to initiate and define rings within the STP domain. Referring to FIG. 2, a flowchart 120 shows the first phase of ring discovery, conducted separately 011 each node for each STP instance. Each node loops through its ports and determines the STP port state for the current instance. If the port is blocking, the node checks whether STRP ring mode is allowed 011 the port. If so, the node will attempt to create a ring through the blocking port. The node creates a ring context, including for instance a region name, the STP domain name, spanning tree instance and/or a ring ID to VLAN ID map hash value, port identifier, and a locally-generated ring ID. The ring ID can be based in part, e.g., 011 a MAC address or other identifier unique to the node, to prevent duplication of ring IDs among nodes. In addition, or in the alternative, if two nodes attempt to create rings with the same ring ID, a node that receives both IDs can alert the creating node or nodes, which will recall the ring ID and then attempt to detect the ring using a different ring ID. Optionally, an administrator can allocate a pool of ring IDs to each switch, with the switches selecting an ID from their pool to avoid duplication.

Referring to FIG. 11A, nodes B, E, and F independently determine that they each possess at least one blocking port. Node B establishes two ring contexts R1, R2, as it has two blocking ports P1, P2. Node E establishes a ring context R3 for its blocking port P3. Node F establishes a ring context R4 for its blocking port P4. The not-yet-established ring contexts present on each node are denoted by brackets, e.g., [1,2] on node B.

Although each blocking port indicates the presence of a loop, STP does not maintain any state information regarding loop paths that were blocked. It is thus up to each node with a blocking port to "discover" a loop passing through that node. Nodes B, E, and F each generate a Ring Discovery Protocol Data Unit (RDPDU) for each ring context they created. The RDPDU contains fields such as a region name (which can be the same as the STP domain name), the STP instance, the ring ID, a hop count, and other information if needed. Each node forwards the RDPDU(s) that it generates on all of its ports that are in the region and are in a forwarding state for the STP instance. Referring again to FIG. 11A, node B forwards two RDPDUs (one for ring context R1 and one for ring context R2) on each of its forwarding nodes, towards nodes D and E. Node E forwards a RDPDU for its ring context R3 on its forwarding node towards node D. Node E does not forward its RDPDU on shared link SL, as it may not be possible to discover loops through the shared link. Node F forwards a RDPDU for its ring context R4 on its forwarding node towards node C. Although node NA has a blocking port, the node does not run STRP and thus does not generate a RDPDU.

The RDPDU uses, e.g., a destination MAC (Media Access Control) address of the form 01:80:C2:00:00:XX (where each character represents a hexadecimal number and the character "X" refers to a user-defined character). The particular MAC address or Organizationally Unique Identifier (OUI) to be used can be user-defined, with, e.g., a default value such as 01:80:C2. Packets destined to any address of this form are consumed by the receiving switch, whether or not that switch supports the protocol carried in the packet, and are never flooded. If the receiving switch does not support the ring protocol, the destination MAC address and/or the protocol type (DSAP/SSAP—Destination Service Access Point/Source Service Access Point) encoded in the RDPDU will be unknown to the switch and the RDPDU will be dropped. If one desires a non-participating switch to be included in a ring, a different OUI can be used, with user-defined behavior on the non-participating switch that allows it to pass the RDPDUs between defined ports. The RDPDUs will also never be forwarded on shared links.

Referring to FIGS. 3, 11A, and 11B, the behavior of a node receiving an RDPDU will now be described. Node D, for instance, receives RDPDUs from node B (ring contexts Ri and R2) and node E (ring context R3). Each RDPDU is recognized by node D and passed to the STRP protocol handier for processing according to flowchart 130 shown in FIG. 3. According to this flowchart, each RDPDU is first examined to determine whether ring mode is allowed on the receive port, and whether the switch is a member of the STRP region carried in the RDPDU. If either of these conditions evaluates false, the RDPDU is dropped.

The STP port state of the receive port is next examined. If the receive port is not blocking, the RDPDU is processed by the node. The RDPDU is copied, and the hop count is incremented. The RDPDU copy is forwarded out all region member ports for that instance that are forwarding and allow ring mode, except for the port on which the RDPDU was received. A context is created for a potential ring, indexed by the ring ID. The context includes all the ring-descriptive information from the RDPDU, as well as the incoming port and the outgoing ports for the RDPDU. Referring to FIG. 11B, node D creates potential contexts [1,2,3] for Ri, R2, and R3. The RDPDUs for Ri and R2 are forwarded towards nodes C, E, and F, and the RDPDU for R3 is forwarded towards nodes B, C, and F.

Although node E received RDPDUs from node B for RI and R2, it did not create ring contexts for those rings. Returning to FIG. 3, node E evaluated its receive port P3 at decision step 132 and found that port to be in an STP blocking state. According to flowchart 130, node E determines that it did not originate the RDPDU (the RDPDU it originated was for ring D R3), and therefore drops the RDPDU.

Node C also received an RDPDU from node F for ring ID R4. In FIG. 11B, node C has created a potential ring context [4], and propagated the RDPDU towards nodes A, B, D, and NA.

The ring discovery process continues in FIG. 11C, as the second set of RDPDUs are received and processed. Node A has received an RDPDU for ring R4, created a context [4], and forwarded the RDPDU towards nodes B and NA. Node B has received an RDPDU for ring R3, created a context [3], and forwarded the RDPDU out its other forwarding port towards node E. Node B has also received an RDPDU for ring R4 on port P2, but drops this RDPDU according to flowchart 130, as receive port P2 is blocking and node B did not originate the RDPDU. Node C has received an RDPDU for each of rings R1, R2, and R3 from node D, created contexts [1,2,3], and forwarded the RDPDUs for each of the rings towards nodes A, B, F, and NA. Node D has received an RDPDU for ring R4, created a context [4], and forwarded the RDPDU towards nodes B, E, and F. Node E received RDPDUs for rings RI and R2, but did not create contexts or forward the RDPDUs because it had no non-blocking non-shared link on which to forward the RDPDUs (and thus could not possibly be part of the R1 and R2 rings). Node F received RDPDUs for rings R1, R2, and R3, but did not create contexts or forward the RDPDUs because they were received on blocking port P4. Node NA received an RDPDU for ring R4, but dropped the packet as node NA does not participate in the protocol.

The ring discovery process continues with processing of the second-hop RDPDUs and generation of third-hop RDPDUs in FIG. 11D. Node A has received RDPDUs for each of rings RI, R2, and R3 from node C, created contexts [1,2,3], and forwarded the RDPDUs for each of the rings towards nodes B and NA. Node B has received an RDPDU for ring R4 from node D, created a context 4, and forwarded the RDPDU out its other forwarding port towards node E. Node B also received an RDPDU for ring R4 from node A on port P1, but drops this RDPDU according to flowchart 130, as receive port PI is blocking and node B did not originate the RDPDU. Node B has received RDPDUs for rings RI, R2, and R3 from node C on port P2. The RDPDUs for rings R1 and R3 are dropped (although node B originated the RDPDU for ring R1, it originated it to discover a ring through port P1, not port P2). The RDPDU for ring R2 was originated by node B to discover a ring through port P2, and that RDPDU has now been received back through port P2. According to flowchart 130 then, node B establishes the ring, with the established ring represented in FIG. 11D by being placed in parentheses (2). Reverse RDPDUs for the established ring will be sent, as will be explained shortly in conjunction with FIG. 11E.

Continuing with the ring discovery process as shown in FIG. 11D, nodes E and F also received RDPDUs that they had originated. Node E received an RDPDU on port P3 for ring R3, and therefore establishes this ring. Node F received an RDPDU on port P4 for ring R4, and therefore establishes this ring. No other node received an RDPDU at this stage that was forwardable or that established a ring.

The ring discovery process continues with processing of the third-hop RDPDUs and generation of reverse RDPDUs in FIG. 11E. Node B has received an RDPDU for ring R1 on port P1, and thus establishes ring Ri. All other RDPDUs propagated in FIG. 11D have been dropped. Accordingly, the first phase of ring discovery has ended.

The RDPDUs received by each originating switch may not result in ring establishment in all circumstances. The hop count contained in the RDPDU when received back at the originating switch indicates the ring size. A ring size of two, for instance, could be rejected as indicative of two switches with multiple back-to-back links between them. An administrator may also deem a ring larger than a certain size as undesirable. Should a ring be detected that exceeds the maximum ring size, that ring could be rejected as well.

In the next phase of ring discovery, the node that originated the ring discovery RDPDU for each ring communicates the established ring status to the members of that ring. Considering first ring RI, node B creates a reverse RDPDU for that ring and sends the RDPDU out its blocking port P1 (the reverse RDPDU is similar to the original RDPDU but has, e.g., a reverse flag set). Nodes A, C, D, and B will receive the reverse RDPDU in turn, and process the reverse RDPDU according to flowchart 140 of FIG. 4. Each node receiving the reverse RDPDU retrieves the context for the ring ID. The context includes the port on which the original RDPDU was received. For instance, node A stored in its context that the ring RI RDPDU was received on the link connected to node C. Node A also knows that it received the reverse RDPDU on the link connected to node B. Node A thus confirms the context for ring 1, and logs the ring 1 ports as the ports linking node A to nodes B and C. Finally, node A forwards the reverse RDPDU in the reverse direction along the ring, i.e., towards node C. The ring 1 links to node A are not shared with any other rings, and thus no further steps from flowchart 140 are processed by node A.

Nodes C and D propagate the ring 1 reverse RDPDU in turn, performing similar confirmation steps. When node B receives the ring 1 RDPDU back from node D, it can begin transmitting health check tokens on the ring.

Using reverse RDPDUs, nodes B, C, and D become members of ring 2, nodes E, B, and D become members of ring 3, and nodes F, C, and D become members of ring 4. The final ring paths for rings 1, 2, 3, and 4 are shown in FIG. 11F. After an expiry time interval has passed without any RDPDUs being received for an unconfirmed ring context (e.g., at node A), the unconfirmed contexts can be flushed.

It is apparent from FIG. 11F that two links are shared by three rings each. The link between nodes B and D is used by rings 1, 2, and 3. The link between nodes C and D is used by rings 1, 2, and 4. If multiple rings were to respond to a failure of one of these shared links, loops could be opened up in the topology. It is therefore desirable that only one ring respond to a failure of a shared link. In order for this to happen, it is necessary for at least some of the ring members to know that a link is shared between multiple rings. One method for accomplishing this is via shared link RDPDUs exchanged in the last phase of ring discovery, i.e., after or as reverse RDPDUs are processed.

Referring again to FIG. 4, decision step 142 triggers a shared link RDPDU. A node that is becoming a ring member logs its ring member ports. At this time, it checks the ring member ports to see if either is a ring member port on another ring that the node is a part of (for the same instance or with shared VLANs). If this is true, the node sends a shared link RDPDU 011 all rings that share the link.

Consider, as an example, node D of FIG. 11G. Assume that node D receives reverse RDPDUs for each of rings 1, 2, 3, and 4, in that order. At the time the ring 1 reverse RDPDU is received, node D is not a confirmed member of any other ring, so 110 shared link RDPDUs are transmitted. When the ring 2 reverse RDPDU is received, however, node D notes that rings 1 and 2 share both of their member ports with each other. Node D creates two shared link RDPDUs. One is a ring 1 RDPDU, and contains a notification that at least one link is shared with ring 2. The other is a ring 2 RDPDU, and contains a notification that at least one link is shared with ring 1. The RDPDUs are forwarded on their respective rings, and alert each ring member to the shared link status. When a ring node receives an RDPDU alerting it of a shared link status from some other ring node 011 the same ring, it will act on it only when the ring IDs contained in the RDPDU do not pass through the receiving ring node. For instance, when node C receives the shared link RDPDUs for rings 1 and 2 from node D, it does not forward them because it is a member of those rings already (and thus has or will send its own shared link RDPDUs). The primary purpose of the shared link alert RDP- DUs is for the ring nodes not on the shared link to create forwarding entries that would allow for propagation of health check tokens in the event of shared link failure. The nodes on the shared link(s) would have such entries already as a result of normal ring operation, and will only need to update the egress port group in the event of a shared link failure.

Next, the ring 3 reverse RDPDU is received by node D. Node D recognizes that the node D to-node B link is shared by rings 1, 2, and 3. Node D creates four shared link RDPDUs. A ring 1 RDPDU contains a notification that at least one link is shared with ring 3; a ring 2 RDPDU contains a notification that at least one link is shared with ring 3; two ring 3 RDPDUs notify the ring 3 nodes that ring 3 shares a link with rings 1 and 2.

One difference with the link sharing of ring 3 at node D is that only one link is shared with ring 1 and ring 2, whereas rings 1 and 2 share both member ports on node D. Node D thus creates alternate, dormant ring paths for rings 1 and 2, using the ring 3 member port that is for now not shared with rings 1 and 2. The use of these alternate paths will become apparent in later examples of ring failure.

Next, the ring 4 reverse RDPDU is received by node D. Node D recognized that the node Dto-node C link is shared by rings 1, 2, and 4. Node D creates four shared link RDPDUs. A ring 1 RDPDU contains a notification that at least one link is shared with ring 4; a ring 2 RDPDU contains a notification that at least one link is shared with ring 4; two ring 4 RDPDUs notify the ring 4 nodes that ring 4 shares a link with rings 1 and 2. Note that although node D serves rings 3 and 4, no member ports are shared between the two links, and therefore the two rings are not notified of each other. Finally, as with ring 3, node D creates alternate, dormant ring paths for rings 1 and 2, using the ring 4 member port that is for now not shared with rings 1 and 2.

Nodes B and C also detect the two shared links (from the opposite ends). Those nodes can also issue shared link RDPDUs, although these can be suppressed if the duplicate shared link RDPDUs from node D are received first.

FIG. 5 illustrates the behavior of a ring member node receiving a shared link RDPDU. If the node originated the shared link RDPDU, the RDPDU has traversed the entire ring, and is discarded. Otherwise, the node adds the link sharing information to the ring context for all ring IDs that share a link, and forwards the shared link RDPDU along the ring.

Ring discovery is now complete. Each node contains a complete context for each ring for which it is a member (shown in FIG. 11H in parentheses), and partial context information for other rings that share a link with the node's rings (shown in FIG. 11H in brackets).

Each ring contains a ring master. The ring master is responsible for checking the ring's health and triggering a topology change if the ring goes down. The ring master for each ring can be chosen in many ways. For instance, the node containing the blocking port is one choice for master. A node containing the most shared links, ring ports, or some other topology-based criteria can be selected as well, using an election procedure similar to the STP root bridge election procedure. Master election can also be based on a preconfigured bridge priority, or can be manually set by an administrator.

Optionally, each ring can also contain a ring secondary or standby master. The secondary node also monitors the health of the ring, as well as the health of the ring master. Should the ring master fail, the ring secondary is prepared to take over as master and repair the ring if possible. The secondary could be elected, for instance, as a ring member with at least one non-shared ring link, to insulate it from dynamic ring shifting.

Normal operation of the ring master and secondary will now be described in conjunction with FIGS. 6, 7, and 11F.

FIG. 6 contains a flowchart 160 for master operation at a node. For active rings, each node that is operating as a ring master generates a Health Check Token (HCT) on the ring. In one embodiment, the health check token is a data plane packet that passes at line rate through all of the ring members except the master. Each ring member, as part of its ring initialization, generates forwarding entries for the HCTs, and then switches the HCTs directly through to the egress ring port. The master node, however, has forwarding entries to direct the HCTs to the control processor for processing according to the STRP protocol. Since the tokens travel at line rate around the ring, the master node can employ small timeout intervals, allowing extremely short network failure detection times. The non-master nodes in the ring do not spend any control processor cycles maintaining the ring under stable network conditions.

Referring to flowchart 160, once the master node has generated a HCT and placed it on the ring, the master sets a timer. If the HCT is received back on the other ring port before the timer expires, the timer is cleared and other functions (e.g., OA&M functions) can be performed prior to sending out another HCT. If the timer expires, however, the master node executes a missing token procedure (note that a ring may require more than one token to go missing to trigger the missing token procedure). Should the missing token procedure indicate that the ring is broken, the master node executes a ring topology change procedure. The missing token and topology change procedures will be described in detail, after description of secondary master behavior.

Figure 7:
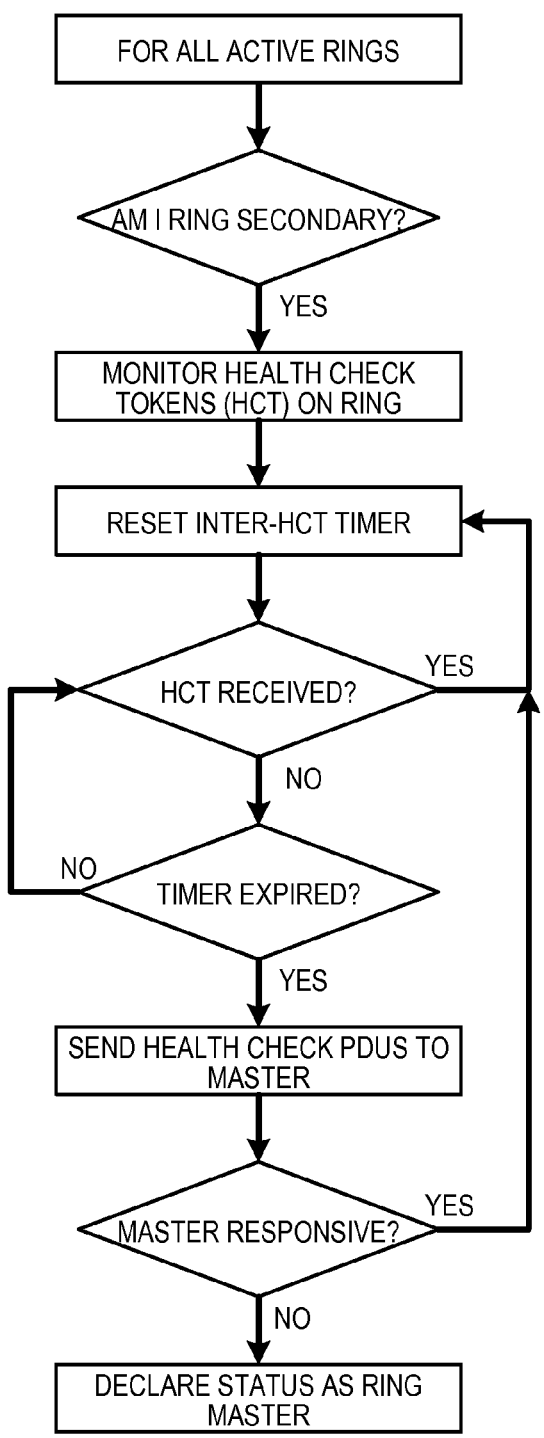
FIG. 7 contains a flowchart for a process used by ring standby nodes to detect and respond to ring and ring master failures.

Flowchart 170 of FIG. 7 outlines the behavior of a ring secondary. The ring secondary, if a ring is so provisioned, monitors the HCTs sent by the master. This can be accomplished by setting the forwarding table in the secondary to forward a copy of the HCTs to the control processor. The secondary maintains an inter-HCT timer. Each time an HCT is received, the timer is reset. Should the inter-HCT timer expire, the secondary sends health check PDUs to the master (one, e.g., in each direction along the ring, in case the ring is broken). If the master responds to at least one of the health check PDUs, the secondary resets its inter-HCT timer and waits for further information. If the master fails to respond, the secondary declares its status as ring master.

Figure 8:
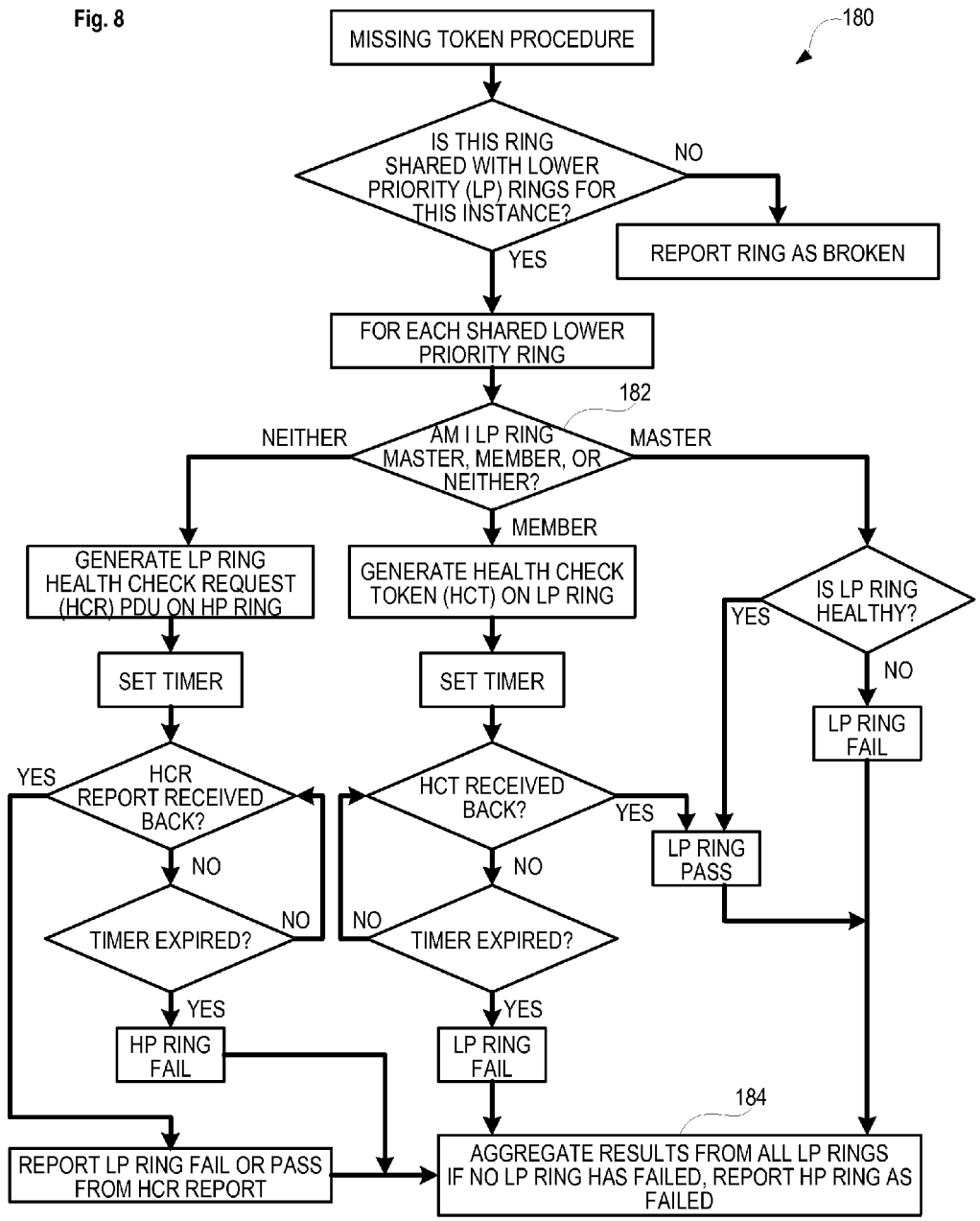
FIG. 8 contains a flowchart for a process used by a ring master to determine that it is the master that should respond to a ring failure.

FIG. 8 contains a flowchart 180 for the missing token procedure of FIG. 6. The missing token procedure uses the concept of ring priority to prevent multiple rings from responding to a single link failure. Ring priority can be based on ring ID, or on some other criteria such as ring size. The following examples assume that ring priority is based on ring ID, with lower-numbered ring IDs having higher priority than larger-numbered ring IDs.

In flowchart 180, when one or more health check tokens go missing for a ring, the master node determines whether the ring is shared (i.e., has at least one shared link) with one or more active lower-priority (LP) rings. If the ring is not shared with LP rings, the ring is reported as broken. If the ring is shared, however, a longer procedure is executed before a broken ring can be declared. The procedure is executed for each shared LP ring. First, at decision block 182 the node determines whether it is a master, member, or neither for the LP ring. If the node is the LP ring master, the node determines whether the LP ring is healthy, e.g., by sending an HCT on the LP ring and receiving it back. The LP ring status (pass or fail) is reported to an aggregator block 184, which is responsible for tabulating the status of each shared LP ring. As the node is the master for the LP ring, it may choose to respond to an LP ring failure at this point.

Another possible branch from decision block 182 is taken if the node is a member of the LP ring. As a member of the LP ring, the node is capable of sending a HCT to itself on the LP ring, setting a timer, and evaluating the status of the LP ring based on whether the HCT is received back prior to the timer expiring. The resulting LP ring status (pass or fail) is reported to the aggregator block 184.

The other possible branch from decision block 182 is taken if the node is not a member of the LP ring. In this case, the node cannot directly evaluate the health of the LP ring. Since the LP ring shares at least one link with the HP (higher priority) ring, there are two other nodes on the HP ring that are capable of directly evaluating the health of the LP ring. The node generates a Health Check Request (HCR) PDU on the HP ring, and forwards the HCR PDU along the ring. The node then sets a timer. If an HCR report PDU is received back prior to the timer expiring, the LP ring fail or pass status from the HCR report is reported to aggregator block 184. If the HCR report PDU is not received back prior to the timer expiring, the nodes assumes that a break in the HP ring exists prior to the link shared with the LP ring.

Aggregator block 184 tabulates the results from all LP rings. If no LP ring has failed, the missing token procedure reports the HP ring as failed. If one LP ring fails, no higher-priority rings need to be tested for failure at this time.

FIG. 9 contains a flowchart 190 for processing HCR PDUs received by a node on the HP ring. Processing depends On whether the HCR PDU is a request or a report. If the HCR PDU is a request, the receiving node evaluates whether it is a member node of the LP ring. If the receiving node is not an LP member, the HCR PDU is forwarded along the HP ring. If the receiving node is an LP member, it consumes the PDU, performs a health check on the LP ring, encapsulates the results of the health check in an HCR report PDU, and sends the HCR report in reverse along the HP ring.

If a node receives an HCR report PDU, it determines whether it was the original requestor of the remote health check. If so, the HCR report PDU is consumed and processed according to flowchart 180. If not, the node forwards the HCR report PDU in the reverse direction on the HP ring.

Several examples of responses to link failures will now be presented. A failed link is represented in the figures by a large "X" through the link. Referring first to FIG. 11H, the link between nodes C and D has failed. Node B will cease receiving its HCTs for rings 1 and 2, and node F will cease receiving its HCTs for ring 4. The preferred response is for ring 4 alone to respond to this link failure, but depending on HCT timing, node B may enter its missing HCT procedure first. If this happens, node B will send an HCR PDU, requesting a health check of ring 4, on ring 1. Node D consumes this PDU, and generates an HCT on ring 4. Node D will therefore discover that ring 4 is broken, and will send an HCR report of this condition back to node B. Node B will then wait for a time for ring 4 to react to the break.

At some point, node F will also discover that its ring 4 HCTs are lost. As node F is the lowest priority ring, it immediately declares its ring broken, and changes the port state of port P4 from blocking to forwarding. Node F creates a Topology Change Notification (TCN) PDU TCN4, which it passes in both directions along what was ring 4. The TCN causes other nodes on ring 4 to perform certain functions to reconfigure the region topology.

The TCN causes a node with a shared link to potentially shift its forwarding entries. If node determines that the shared link is down (as will be described in detail shortly), it shifts the forwarding entries for higher priority rings that share the shared link. The higher priority rings are shifted from the shared link port to the other port of the LP ring. In the case of FIG. 11J, node D shifts its forwarding entries such that ring 1 and ring 2 traffic are now passed to node F. Node F has already been configured to pass ring 1 and ring 2 traffic along ring 4, during the shared link phase of ring discovery. Finally, node C shifts its forwarding entries such that ring 1 and ring 2 traffic from node F are passed along their respective rings. Accordingly, as shown in FIG. 11J, rings 1 and 2 continue to exist, but have now been expanded to monitor the unbroken links of former ring 4.

FIG. 11K shows a scenario where a second broken link is added to the region of FIG. 11J. The second broken link occurs on the shared link between nodes B and D, and is potentially detected by rings 1, 2, and 3. As node B is a member of ring 3, if it detects the break prior to node E, it can check the health of ring 3 directly. Node E, as the master of the lowest priority affected ring, changes the port state of port P3 from blocking to forwarding when it discovers the break. Node B shifts its ring 1 and ring 2 forward port to the ring 3 forward port upon receiving a TCN from node E. Node D shifts its ring 1 and ring 2 reverse port to the ring 3 reverse port upon receiving a TCN from node E. Rings 1 and 2 have once again expanded, and now monitor the unbroken links of former ring 3.

FIG. 11L shows a scenario where a third broken link is added to the breaks of FIG. 11K. The third broken link occurs on the link between nodes C and F, and affects both remaining rings 1 and 2. As node B is the master for both rings, it chooses to change the port state of port P2 (belonging to the lowest priority remaining ring) from blocking to forwarding. Node B shifts its ring 1 forward port to the ring 2 reverse port (as the path through the ring 2 forward port is blocked). Ring 1, the only remaining ring, now comprises only nodes A, B, and C.

For broken rings, the ring master continues to monitor the ring for the possibility of the ring coming back up, by sending HCTs on the forward ports that have been used for the ring. For instance, node B continues to attempt to send ring 2 HCTs toward nodes D and E. Although node D cannot receive these HCTs, node E can, and forwards them to node D. Node D, in turn, attempts to forward the ring 2 HCTs along the forward ports that have been used for the ring (e.g., towards nodes C and F). In FIG. 11M, the link between nodes D and C is restored, causing the ring 2 HCTs to make it back to node B via a path through nodes E, D and C. Ring 2 is thus restored, and the port state of port P2 reverts to blocking. As this port was being used as a forward port for ring 1, the ring 1 forward port is shifted back to the ring 2 forward port.

Another example of a ring coming back up is shown in FIG. 11N. The link between nodes C and F is restored. This causes HCTs for ring 4 to make it back to node F. Node F restores ring 4, and the port state of port P4 reverts to blocking. As the restoration did not affect a shared link, the other rings are unaffected by the restoration of ring 4

In some embodiments, nodes affected by a ring topology change could choose to flush their forwarding tables. In other embodiments, each node determines the manner in which it is affected by a topology change, and may selectively flush and/or move forwarding entries. FIG. 10 illustrates one such topology change procedure in flowchart 200. The topology change procedure is initiated by the master. The master sends forward and reverse TCN PDUs along the ring to alert the ring members that the port state is being changed for a ring member port. Each node receiving a TCN PDU both forwards the TCN PDU in the same direction along the ring, and also reverses the TCN PDU back to the last node that transmitted it. In this manner, each ring node determines whether its two ring links are up by whether it receives the TCN PDU on both ring ports. The forward-propagating TCNs can be switched in hardware along the ring at the same time they are forwarded to the control processor on each node, thereby speeding convergence of the new ring topology.

Assuming the ring has been broken, the node that has a blocking port will change the port state from blocking to forwarding. If the blocking port is on the master, the master can unblock the port without waiting for TCN propagation. If the blocking port is on another ring node, that ring node will unblock the port upon receiving the TCN.

In some embodiments, forwarding entries at each node are grouped logically according to a logical ring port. For instance, if the four rings in the illustrated examples correspond to an MSTP instance 1, the MSTP instance 1 forwarding entries that use ring nodes can be associated logically with ring ports. As an example, the MSTP instance 1 forwarding entries that exit node B on the port facing node D can be stored with a logical destination port of "ring 1 forwarding port 1 ring 2 forwarding port." This level of abstraction is removed during packet processing by referencing a forwarding entry that gives an actual port number for the logical port "ring 1 forwarding port 1 ring 2 forwarding port." As another example, the MSTP instance 1 entries that exit node A on the port facing node B can be stored with a logical destination port of "ring 1 forwarding port" and those entries that exit node A on the port facing node C can be stored with a logical destination port of "ring 1 reverse port." These logical names can also be used for source ports. When a ring topology change occurs, the logical port designations can be used to a) redirect the forwarding entries by changing a single CAM entry, or b) specify a logical group of entries to be flushed from the forwarding tables.

Returning to the TCN example and flowchart 200, each node has determined whether it is connected directly to the broken link, either through the TCN exchange process or through some other means. Decision block 202 determines how the node's forwarding entries will be affected, based on whether the broken link is on a node port. If the broken link does not abut the node, the node will not know which direction to forward traffic on the broken ring to reach other ring members. Accordingly, all logical group entries with a logical destination port that is a ring port on the broken ring are flushed and must be relearned.

When decision block 202 determines that the broken link is on a node port, the forwarding entries that have a destination port on the broken ring are not all flushed. Instead, forwarding entries that have both a source port and a destination port on the broken ring are flushed. For the remaining entries, the logical group that has a destination port specifying the broken port is "moved" by changing the value of the broken port to the non-broken port of the ring. All other entries are unaffected (multicast entries are not considered here).

Figure 12:
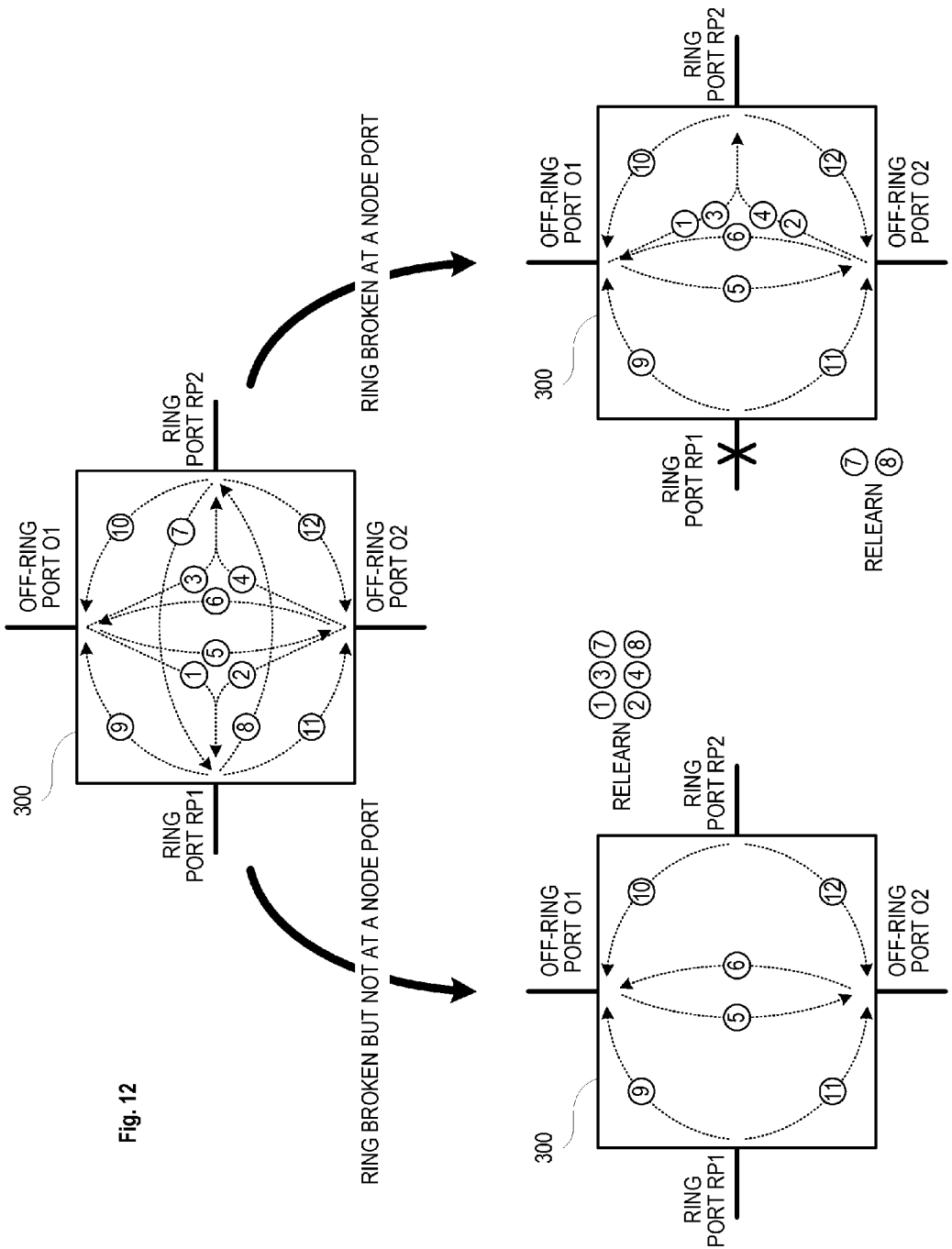
FIG. 12 illustrates the use of link abstraction at a node to respond to a topology change notification with minimal flushing or changing of forwarding table information.

FIG. 12 illustrates these forwarding entry change procedures for a simple switch 300. Switch 300 comprises four ports: ring ports RP1 and RP2, and off-ring ports 01 and 02. Other port pairings in other rings could exist, and are not considered in this example.

Twelve logical forwarding groups are illustrated, one from each port to each other port. FIG. 12 shows how these different groups are affected by a break in the ring, both at a location away from the node and at a node port.

First, when the ring is broken at a location away from switch 300, the switch cannot guarantee that traffic switched onto or along the ring will not be blocked by the ring failure. The switch thus flushes logical groups 1-4 (which forward traffic from an off-ring port to a ring port) and logical groups 7 and 8 (which forward traffic from a ring port to a ring port). Logical groups 9-12 (which forward traffic from a ring port to an off-ring port) are left in place, although some entries may no longer be used and will eventually age out. Logical groups 5 and 6 forward off-ring traffic to off-ring destinations, and are unaffected by the ring state.

Second, when the ring is broken at one of the two switch ports on the ring, the switch knows that any destination previously reachable through the broken link is now reachable by traversing the ring in the other direction. Thus, when ring port RP1 is down, logical groups 1 and 2 can be redirected out ring port RP2, and logical groups 3 and 4 can continue to be forwarded out ring port RP2. Only the logical groups 7 and 8, which were forwarded along the ring, must be flushed and relearned.

In some embodiments, the logical port entries for ring HCTs and PDUs are maintained separately, such that the rings can be dynamically manipulated, e.g., when shared links go down or come back up. Such manipulation is apparent in the examples above showing ring redirection upon shared link failure or reestablishment.

In at least some embodiments, one or more switches may not participate in the ring topology, but will continue to run in an STP mode. The STP-mode switches will expect to communicate with the region members using STP Bridge Protocol Data Units (BPDUs). Ring-mode switches can passively forward these BPDUs across ring-mode links, such that other STP-mode switches continue to receive the BPDUs. The ring mode switches can also parse the BPDUs to determine whether there is any topology change information that affects the ring members.

In an embodiment, one or more switches may neither participate in the ring protocol nor participate in the spanning tree protocol. Such a switch can passively switch the ring control and data plane PDUs. Although some functionality may be lost as a result, this is possible when no other options exist.

In at least some embodiments, the STRP protocol performs 0A&M functions. The use ofline-rate health check tokens switched on the data plane, for instance, allows the ring master (or another ring member) to precisely measure the ring transit time by issuing a HCT on the ring and timing the interval between the HCT issue time and the time the HCT is received back. The master (or another ring member) can also measure the control plane ring transit times by issuing an OA&M PDU. The OA&M PDU contains a field that addresses one of the ring nodes (including if desired the node that issued it). When a ring node control processor receives an OA&M PDU that is not addressed to it, it forwards that PDU in the same ring direction that it was traveling. When a ring node control processor receives an OA&M PDU addressed to it, it reverses the ring direction of the PDU. Thus by determining the data plane transit time and the PDU control plane turnaround times to each ring node, a node can obtain an idea of the hardware and software forwarding latencies for the various hops in the ring. This information can be used to set ring timer values for various functions, to aid traffic engineering, and to generate dynamic traffic measurements. By comparing average node latencies for different rings, for instance, bottlenecks can be located.

One use of HCT ring transit time is to help set the HCT timeout interval (the time interval that must pass before a HCT is declared missing) and HCT hello interval (the time interval between consecutive HCT issuances). Different rings have different hop counts, and rings can even change hop counts without going down, as shown in the examples above. Furthermore, rings that traverse oversubscribed interfaces or inter-city links, for instance, will experience variable delays and intermittent congestion. With a fixed timeout interval, during extended periods of congestion the HCTs can be delayed enough to cause the master to believe the ring is broken and incorrectly change the port state of the ring's blocking port. This causes ring TCN traffic, a loop in the topology, and packet flooding as the ring members attempt to relearn flushed addresses, all of which add to the congestion. Eventually the congestion subsides, causing the master to realize the ring is not broken (it never was), and the ring is once again busied by a topology change. This ring "flapping" is highly undesirable, and thus the fixed timeout interval may require a large margin of error—which decreases the response time of the ring.

In at least some embodiments, the HCT ring transit times are filtered to create HCT transit time statistics. A HCT mean ring transit time and HCT ring transit time standard deviation are initialized to overly conservative values, e.g., based 011 past experience with the network and the number of hops in the ring. As each HCT is received, its actual ring transit time is used as a filter measurement to update the mean and standard deviation values, with some desired time constant. These filtered values are used in turn to set a timeout interval for the HCTs. Predictable, short ring transit times will thus result in a tightened timeout interval. As either predictability or mean transit time increases, the timeout interval increases as well. This allows the ring protocol to give a response to failures commensurate with the near-term observed network performance. The HCT statistics can also be used to adjust the hello interval commensurate with network performance. Other timers discussed in the embodiments above can also benefit from the ring transit statistics. Exact filter design, initialization values, and parameters for mapping the HCT statistics to timer intervals will be implementation-dependent.

Many of the inventive concepts disclosed herein can be practiced separate from each other. For instance, the ring systems disclosed herein can be implemented without the disclosed ring discovery mechanisms, e.g., with one or more rings manually provisioned. Rings discovered using MSTP instances need not be associated with MSTP instances, but can use a custom VLAN mapping. Ring discovery need not allow for shared rings in all implementations. Other shared ring implementations can be used, such as a rule that always circulates higher-priority ring tokens both directions around a shared-link lower-priority ring (and preferably absorbs multiple copies at the other end of the shared link). This ensures that a higher-priority ring will never detect failure of the shared link, at the expense of higher traffic on the lower-priority ring.

The techniques presented above are exemplary. Many of the functions described above can be performed in multiple ways other than those described, as will be apparent to those familiar with the art after reading this description. Some nodes may have functionality that allows them to perform particular functions more efficiently or in a different order than in the manner described—the above description is presented in general terms with the recognition that individual implementations will differ. In a given embodiment, various ones of the functions described above can be performed in hardware, in software, or in some combination of the two. Although a given implementation may contain all or a great deal of the functionality described above, many of the concepts described above can be implemented independent of the other concepts or in conjunction with a greatly reduced set of the overall spanning tree ring architecture described. Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the claims.

We claim:

1. A method for discovering a ring network topology in a spanning tree domain comprising:
    a network device identifying that at least one of its ports is both a blocking port and configured to run a spanning tree ring protocol (STRP) and, in response, creating a ring context for the at least one identified port;
    generating a ring discovery message for the ring context and transmitting the ring discovery message from a forwarding port;
    the network device receiving the ring discovery message at its blocking port, determining that a complete ring topology for the ring context exists and, in response, establishing a ring for the ring context; and
    generating and transmitting a reverse ring discovery message from its blocking port that includes communicating the status of the established ring to all of the members of the ring topology.

2. The method of claim 1 wherein the network device is a router or a switch.

3. The method of claim 1 wherein the ring context is comprised of a region name, an STP domain name, a spanning tree instance, a ring ID to VLAN ID map has value, port identifier, and locally-generated ring ID.

4. The method of claim 1 wherein the ring discovery message is protocol data unit comprised of a region name, an STP instance, a ring ID, and a hop count.

5. The method of claim 1 wherein the complete ring topology is comprised of three or more network devices connected in a loop.

6. The method of claim 1 where ring discover uses spanning tree protocol port states to initiate and define rings within the spanning tree protocol domain.

7. A method for discovering a shared-link ring network topology in a spanning tree domain comprising:
    a first network device identifying that at least one of its ports is both a blocking port and configured to run a spanning tree ring protocol (STRP) and, in response, creating a ring context for the at least one identified port;
    generating a ring discovery message for the ring context and transmitting the ring discovery message from a forwarding port;
    the first network device receiving the ring discovery message at its blocking port and determining that a first complete ring topology for the ring context exists;
    generating and transmitting a reverse ring discovery message from its blocking port that includes communicating the status of the established ring to all of the network devices that are members of the first ring topology;
    receiving a shared-link notification ring protocol data unit (RPDU) from a network device located on the first ring topology, the shared-link notification RPDU notifying the first network device that at least one link between two network devices in the first ring topology is shared with a second ring topology;
    based on notification of the shared ring, the first network device adding forwarding table entries to a forwarding database to permit forwarding of a health check token generated by the second network device on the second ring; and
    the members of the first ring topology continuing to forward data when the shared link fails while a network device on the second ring topology detects the shared link failure and enables an alternate path on the second ring topology.

8. The method of claim 7 wherein the first network device is a router or a switch.

9. The method of claim 7 wherein the ring context is comprised of a region name, an STP domain name, a spanning tree instance, a ring ID to VLAN ID map has value, port identifier, and locally-generated ring ID.

10. The method of claim 7 wherein the ring discovery message is protocol data unit comprised of a region name, an STP instance, a ring ID, and a hop count.

11. The method of claim 7 wherein the complete ring topology is comprised of three or more network devices connected in a loop.

12. The method of claim 7 where ring discover uses spanning tree protocol port states to initiate and define rings within the spanning tree protocol domain.

13. The method of claim 7 wherein the forwarding table entries allow for the propagation of health check tokens in the event of a shared link failure.

\* \* \* \* \*